US008931099B2

(12) United States Patent
Lahann et al.

(10) Patent No.: US 8,931,099 B2
(45) Date of Patent: Jan. 6, 2015

(54) SYSTEM, METHOD AND PROGRAM FOR IDENTIFYING AND PREVENTING MALICIOUS INTRUSIONS

(71) Applicant: International Business Machines Corporation, Armonk, NY (US)

(72) Inventors: Jeffrey S. Lahann, Queen Creek, AZ (US); Frederic G. Thiele, Niwot, CO (US); Michael A. Walter, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/965,303

(22) Filed: Aug. 13, 2013

(65) Prior Publication Data

US 2013/0333036 A1    Dec. 12, 2013

Related U.S. Application Data

(63) Continuation of application No. 11/166,550, filed on Jun. 24, 2005, now abandoned.

(51) Int. Cl.
*G06F 11/00* (2006.01)
*G06F 21/56* (2013.01)
*H04L 29/06* (2006.01)

(52) U.S. Cl.
CPC ............ *G06F 21/56* (2013.01); *H04L 63/1416* (2013.01)
USPC ................................. 726/23; 726/22; 713/188

(58) Field of Classification Search
CPC ..... G06F 21/56; G06F 21/55; H04L 63/1416; H04L 63/1433; H04L 63/1408; H04L 63/16; H04L 63/1466

USPC ........................... 726/22, 23, 24, 25; 713/188
See application file for complete search history.

(56) References Cited

U.S. PATENT DOCUMENTS

| 5,761,440 A | 6/1998 | DeMarco et al. |
| 6,657,956 B1 * | 12/2003 | Sigaud ........................... 370/230 |
| 6,950,434 B1 * | 9/2005 | Viswanath et al. ........... 370/392 |

(Continued)

OTHER PUBLICATIONS

Mansfield et al, "Towards trapping wily intruders in the large", Cyber Solutions Inc. 6-6-3, Minami Yoshinari, Aoba-ku, Sendai, Japan Graduate School of Information Sciences, Tohoku University, Sendai, Japan; 1999; pp. 1-13.

(Continued)

*Primary Examiner* — Harunur Rashid
(74) *Attorney, Agent, or Firm* — Matthew H. Chung; Arthur J. Samodovitz (57) ABSTRACT

Computer system, method and program product for identifying a malicious intrusion. A first number of different destination IP addresses, a second number of different destination ports and a third number of different signatures of messages, are identified from a source IP address during a predetermined period. A determination is made that in one or more other such predetermined periods the source IP address sent messages having the first number of different destination IP addresses, the second number of different destination ports and the third number of different signatures. Based on the determination that in the one or more other such predetermined periods the source IP address sent messages having the first number of different destination IP addresses, the second number of different destination ports and the third number of different signatures, a determination is made that the messages are characteristic of a malicious intrusion.

6 Claims, 4 Drawing Sheets

(56) References Cited

U.S. PATENT DOCUMENTS

| | | |
|---|---|---|
| 7,017,185 B1* | 3/2006 | Wiley et al. .................. 726/23 |
| 7,181,765 B2* | 2/2007 | Patel et al. .................. 726/12 |
| 7,246,156 B2* | 7/2007 | Ginter et al. ................ 709/217 |
| 7,424,744 B1 | 9/2008 | Wu et al. |
| 7,440,406 B2* | 10/2008 | Lee et al. ................... 370/241 |
| 2002/0035698 A1 | 3/2002 | Halan et al. |
| 2003/0196123 A1 | 10/2003 | Rowland et al. |
| 2004/0117478 A1* | 6/2004 | Triulzi et al. ............... 709/224 |
| 2005/0091533 A1* | 4/2005 | Omote et al. ................ 713/201 |
| 2006/0047832 A1* | 3/2006 | Betts et al. .................. 709/229 |
| 2006/0137009 A1* | 6/2006 | Chesla ....................... 726/22 |
| 2006/0212572 A1* | 9/2006 | Afek et al. .................. 709/225 |

OTHER PUBLICATIONS

U.S. Appl. No. 11/166,550, Non-Final Office Action mailed Dec. 23, 2008.
U.S. Appl. No. 11/166,550, Final Office Action mailed Jun. 25, 2009.
U.S. Appl. No. 11/166,550, Non-Final Office Action mailed Feb. 22, 2010.
U.S. Appl. No. 11/166,550, Advisory Action mailed Oct. 9, 2009.
U.S. Appl. No. 11/166,550, Advisory Action mailed Dec. 4, 2009.
U.S. Appl. No. 11/166,550, Advisory Action mailed Nov. 17, 2009.

\* cited by examiner

SYSTEM, METHOD AND PROGRAM FOR IDENTIFYING AND PREVENTING MALICIOUS INTRUSIONS

CROSS REFERENCE TO RELATED APPLICATION

This application is a continuation of abandoned U.S. Ser. No. 11/166,550, filed Jun. 24, 2005, which published Dec. 28, 2006, as U.S. Patent Publication No. 20060294588 A1.

BACKGROUND

The present invention relates generally to computer systems, and more particularly to identifying and preventing malicious intrusions.

Computer attacks or intrusions are common today. Some examples are viruses, worms, buffer overflow attacks, malformed URL attacks, and brute force/denial or service attacks. Computer intrusions are typically received via a network intranet or Internet interface targeted at the operating system or an installed service. Computer firewalls can prevent some types of malicious intrusions, although they typically need a signature of the virus or worm or source IP address of the hacker to thwart the intrusion. Before the virus or worm and its signature are identified, the firewall cannot be configured to block it.

A computer virus is a computer program that is normally harmful in nature to a computer user. Computer viruses are received via several media, such as a computer diskette, e-mail or vulnerable program. Once a virus is received by a user, it remains "dormant" until it is executed by the user (or other program). A virus typically requires a user or program to execute the virus to spread the virus and infect others. When the computer virus is contained in an e-mail as an attachment, the e-mail and attachment are addressed to a specified destination (or target) IP address, and a specified destination (or target port) at the destination address. The destination port is typically associated with a communication protocol and application to handle the message.

A computer worm is a computer program similar to a computer virus, except that a computer worm does not require action by a person to become active. A computer worm exploits some vulnerability in a system to gain access to that system. Once the worm has infected a particular system, it replicates by executing itself. Normally, worms execute themselves and spawn a process that searches for other computers on nearby networks. If a vulnerable computer is found, the worm infects this computer and the cycle continues. When the computer worm is contained in an e-mail as an attachment, the e-mail and attachment are addressed to a specified destination (or target) IP address, and a specified destination (or target) port at the destination IP address. As noted above, the destination port is typically associated with a communication protocol and application to handle the message.

As noted above, some types of computer intrusions (including viruses and worms) have a characteristic signature by which the intrusion can be identified. The signature can take various forms depending on the nature of the virus or worm, but typically comprises several consecutive lines of plain text or executable code that are distinctive and appear in the virus or worm program. Once a signature is determined for a new computer virus or worm, intrusion detection or intrusion prevention software can be created and distributed to customers for inclusion in their firewalls. The intrusion detection or intrusion prevention software detects the virus or worm from a network interface card (NIC) or when the virus or worm attempts to pass through a firewall. The detection is by a "key word" search for the signature of the virus or worm. The intrusion prevention or intrusion detection software will then thwart the virus or worm by deleting it or preventing its execution by appropriate command to the operating system.

It is important to identify new computer intrusions (and their signatures), as soon as possible after the new intrusion is released. Then, its signatures can be identified and the intrusion prevention or intrusion detection software can be created and distributed to customers.

A hacker may also send "exploitation" code to the victim's server or workstation, which code automatically exploits vulnerabilities in a victim's server, as would a hacker do manually. For example, a buffer overflow attack exploitation program exploits a vulnerability, typically caused by programmer error, that allows for arbitrary code execution on the target system. As another example, an attacker can inject special machine code into a program variable (usually input by a user) to cause arbitrary code execution in a program. This special code, once given to the program to execute, is placed in the correct area of computer memory, such that the executing program is unaware of the malicious intent of the injected code. There are several classes of buffer overflow, including format string, remote and local. It is important to thwart exploitation code, as well as viruses and worm.

Intrusion Detection Systems ("IDSs") are currently known and have a list of signatures of known or suspected viruses, worms and other common intrusions. The IDS may be logically located behind a firewall. The IDS searches each packet it receives for the signatures in its list, and thereby detects a virus, worm or other intrusion. When this occurs, the IDS notifies a security operations center ("SOC"), and the SOC will check that the proper anti-virus, anti-worm or other intrusion protection software is currently installed in the enterprise or customer network. While the IDS is effective in safeguarding an enterprise against confirmed certain viruses, worm and other intrusions which are known or suspected, improvements are need to identify malicious intrusions which have not yet been identified and for which their signatures are not yet identified.

Some types of source profiling are also known to identify new computer intrusions. For example, US Published Patent Application US 2002/0035698 A1 discloses receipt and analysis of network traffic destined for services to identify an undesirable use of the services. This published patent application also discloses identification of topologically anomalous application-level patterns of traffic and removal of these data flows in real-time from the network. The published patent application considers temporal parameters such as time of day, day of week, day of month and holidays when the traffic occurs.

US Published Patent Application US 2004/0117478 A1 discloses a system for analyzing network traffic to detect suspect packets and identify intrusions or potential threats. Data packets which meet defined criteria are detected and their details forwarded to a database server where the details are stored so as to be accessible for use in analysis in conjunction with the details of other detected packets. The objective of the published patent application is to allow users to detect hostile network activity and take action based both on real-time information and correlation with historical data. This published patent application performs historical analysis and correlation on the traffic, to build up profiles of both attackers. The published patent application also discloses that to detect some types of intrusions it is useful to have some state in a sniffer. Statefulness is important in detecting a large number of hanging connections in a denial of service attack against a specific machine. Another area where statefulness is useful is to detect sudden peaks in the number of packets directed at specific hosts or specific ports. An alert is raised when changes in traffic patterns are detected even if the individual packets seem harmless, and are not logged to the database.

An object of the present invention is to identify new computer viruses, worms and other unwanted intrusions.

SUMMARY OF THE INVENTION

The present invention resides in a computer system, method and program product for identifying a malicious intrusion. A first number of different destination IP addresses, a second number of different destination ports and a third number of different signatures of messages, are identified from a source IP address during a predetermined period. A determination is made that in one or more other such predetermined periods the source IP address sent messages having the first number of different destination IP addresses, the second number of different destination ports and the third number of different signatures.

In accordance with a feature of the present invention, based on the determination that in the one or more other such predetermined periods the source IP address sent messages having the first number of different destination IP addresses, the second number of different destination ports and the third number of different signatures, a determination is made that the messages are characteristic of a malicious intrusion.

DETAILED DESCRIPTION OF THE PREFERRED EMBODIMENTS

Figure 1:
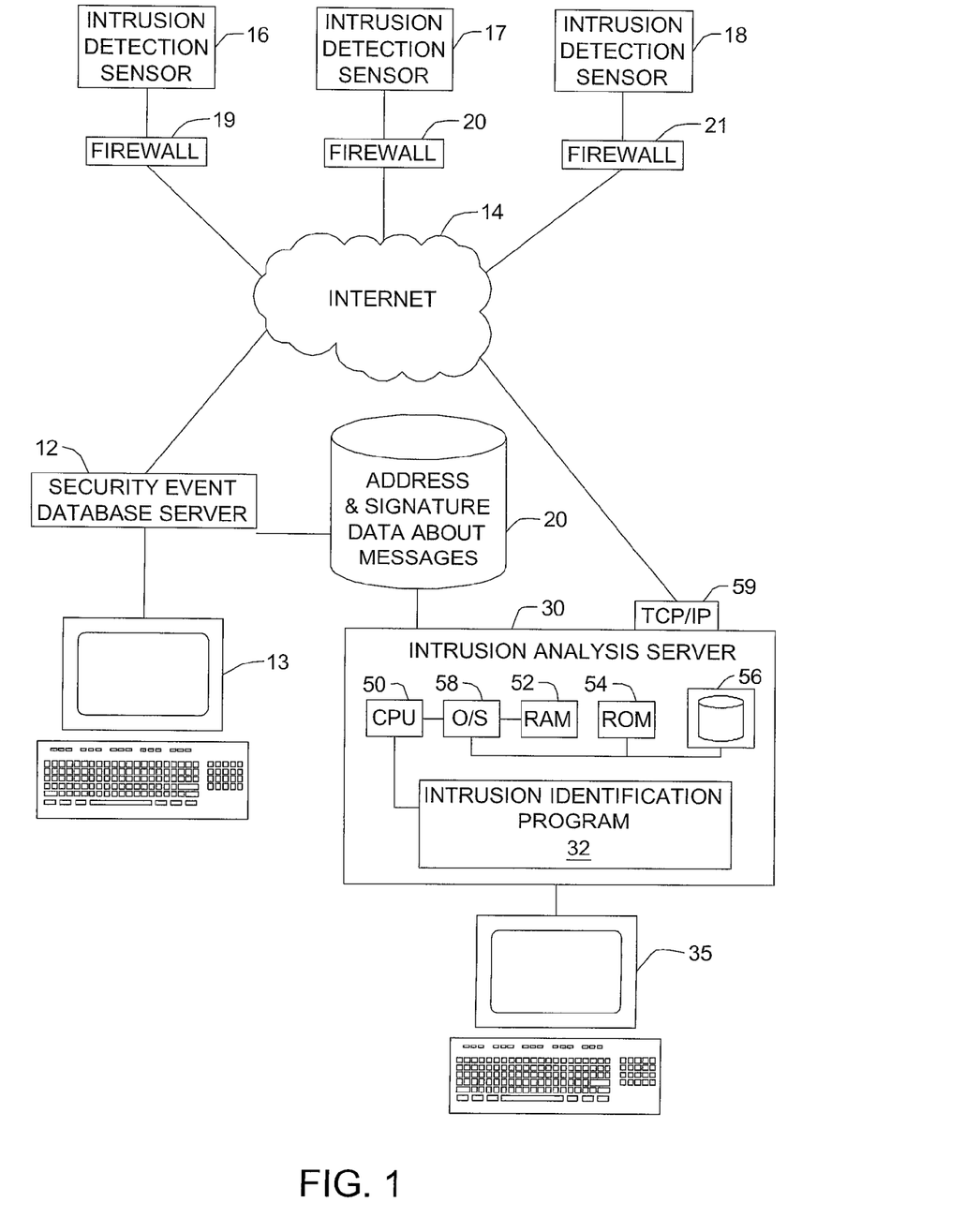
FIG. 1 is a block diagram of a computer system which incorporates the present invention.

The present invention will now be described in detail with reference to the figures, where like reference numbers indicate like elements throughout. FIG. 1 illustrates a computer system 10 which incorporates the present invention. System 10 includes known firewalls 19, 20 and 21 which block known viruses, worms and other intrusions based on their known signatures, source IP addresses, source port, or destination port according to the prior art to prevent them from passing through the firewall to the intended destination IP address. However, there are other intrusions without source IP addresses, signatures, source ports, or destination ports known to firewalls 19, 20 and 21 as malicious. So, firewalls 19, 20 and 21 may not be configured to block them (until confirmed as malicious). Nevertheless, for some of these messages, there are indicia to suspect that they are malicious, such as the following:

nature of data generated by the message.
destination TCP port where malware is known to exist.
multiple failed login attempts to a host trying to authenticate a user.
TCP/IP packet content data that attempts to execute code.
multiple incomplete TCP/IP "three way handshakes".
connection attempts from known "blacklisted" (bad IP address list) IP address.

System 10 includes intrusion detection sensors 16, 17 and 18 which are logically located behind respective firewalls 19, 20 and 21. By way of example, sensors 16, 17 and 18 comprise network hardware devices that detect malicious activity by matching individual TCP/IP packets to signatures located in the hardware device. Sensors 16, 17 and 18 detect suspected intrusions (based on the factors noted above), which pass through the respective firewalls 19, 20 and 21. In response to such suspected intrusions, sensors 16, 17 and 18 notify a security-event database server 12 via Internet 14. In the notification, the sensors 16, 17 or 18 identify each message suspected to be an intrusion, the signature of the intrusion (if it matches one in a list within the sensor), the time of day, day of week, and day of month of the intrusion, the source IP address, destination IP address, destination port, and packet contents. Server 12 stores the data describing each message in a database 20. Server 12 also displays this "raw" data about the messages on a console 13 for (unassisted) analysis by a human analyst.

System 10 also includes an intrusion analysis server 30 which includes a conventional CPU 50, RAM 52, ROM 54, storage 56, operating system 58 and TCP/IP adapter card 59. Server 30 also includes an intrusion identification program 32 according to the present invention. Program 32 is responsible for profiling the data (both historical and current) about the messages suspected of being intrusions to detect patterns indicative of a malicious intrusion. Server 30 also displays to a human analyst on a console 35 the profiles and other analyses generated by program 32 to allow the analyst to make a final determination whether messages which have been detected are malicious. If so, the analyst can notify an administrator for firewalls 19, 20 and 21 to block subsequent messages from the source IP address of these messages and all messages with this signature. Alternately, the analyst can directly update configuration files within firewalls 16, 17 and 18 accordingly to block subsequent messages from this source IP addresses or all messages with this signature.

Figure 2A:
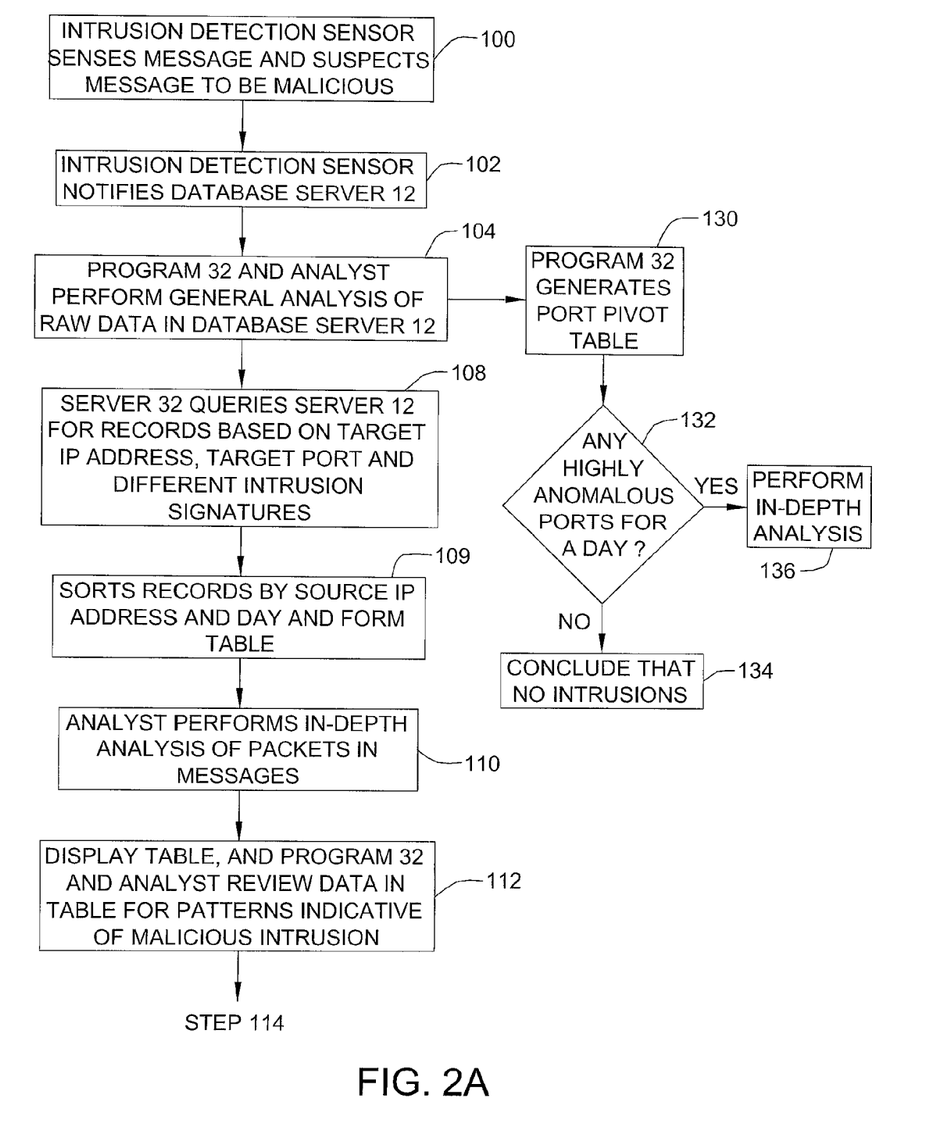
FIGS. 2(A) and 2(B) form a flow chart illustrating an intrusion identification program within the computer system of FIG. 1.
Figure 2B:
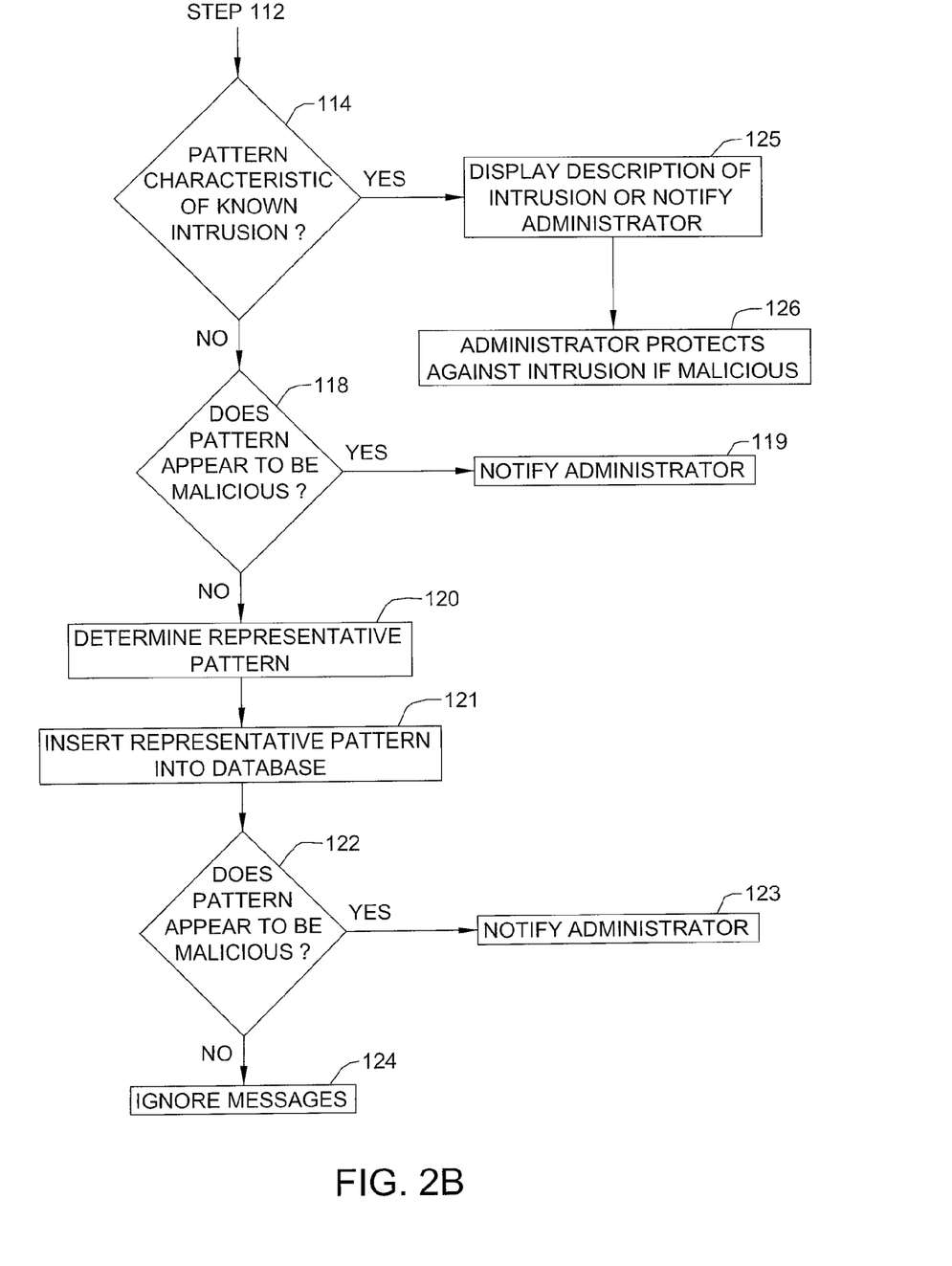

FIG. 2 illustrates intrusion identification program 32 and related manual and automatic processing in more detail. In step 100, an intrusion detection sensor 16, 17 or 18 detects a message which has passed through the respective firewall 19, 20 or 21 and suspects the message to be an intrusion based on one or more of the indicia noted above. In response, sensor 16, 17 or 18 notifies database server 12 and identifies the message (as noted above) which is suspected to be an intrusion. In response, server 12 records in database 20 information about the suspected intrusion, including its source IP address, destination IP address, destination port, signature if known to sensor 16, 17 or 18, time of day, day of week, day of month, week of year (step 102). Periodically, such as daily, a human analyst at console 13 performs a general analysis of the records in database 20 (step 104). The general analysis comprises reviewing data that scrolls through console 13, and determining, to the best knowledge of the human analyst, if the data is known to be malicious or benign. Alternately, program 32 can generally analyze the data by comparing it to a list of source IP addresses, source ports, etc. known to be malicious. After step 104, two series of steps are performed in parallel. In one series, program 32 sorts and tallies for each source IP address the number of different destination IP addresses, number of different destination ports and number of different signatures matched during a predetermined period, such as each day. This sorting and tallying is performed as follows. In step 108, program 32 queries the records in database 20 for different target IP addresses, different target ports and different suspected intrusion signatures, for each source IP address. In step 109, program 32 sorts or aggregates the records obtained in step 300 for each source IP address for each day, and records them in an HTML table 40. Next, an analyst performs an in-depth analysis of individual packets within the messages (step 110). This in-depth analysis comprises using known specialized data analysis tools to look at data in more detail than that of the general analysis. That is, if the human analyst identifies malicious traffic, or what he or she deems to be malicious traffic, the human analyst can use custom data analysis tools to prove or disprove their assumptions. The custom data analysis tools perform functions such as the following functions:

plot raw data into graphs for visual interpretation (where the x-axis can be time, the y-axis can be source IP address, destination IP address, destination port, message signature, etc. with different colors for different source IP addresses, destination IP addresses, destination ports, message signatures, etc. and     log reports from the analyst to the customer of results of human analysis, and different types of signatures that the IDS detected as suspicious.

Next, program 32 displays the HTML table 40 and program 32 and the analyst reviews the compilations made by program 32 indicating the number of different target IP addresses, number of different target ports and number of different intrusion signatures matched during each day for each source IP address (step 112). Each HTML table includes this daily data for suspected intrusions over several or many days such as thirty. Next, intrusion analysis program 32 determines, based on the data and statistics in table 40, whether there is a pattern of messages characteristic of a known intrusion, either harmless or harmful (decision 114). By way of example, such patterns for each source IP address can be a combination of:

(a) number of different target IP addresses in all messages from the same source IP address during a predetermined (for example, daily) period;

(b) number of different target ports in all the messages from that same source IP address during the same predetermined (for example, daily) period; and     (c) number of different (ex. virus, worm, etc.) suspected intrusion signatures matched (against a list in the sensors) in all the messages from that same source IP address during the same predetermined (for example, daily) period; wherein     (d) during a longer predetermined period, such as monthly, there are at least two, (and typically several) daily periods during which the number of different target IP addresses, number of different target ports and number of different intrusion signatures for the same source IP address was the same. For example, during a one month period there may be eleven different days during which there were a total of five different target IP addresses, four different target ports and three different matched intrusion signatures, from messages originated from the same source IP address. As explained in more detail below, the repetition of these numbers often represents a pattern indicative of the nature of the messages, either friendly or malicious. (Typically, a frequent repetition of these numbers during the monthly period tends to indicate a malicious intrusion, assuming the source IP address is not known to be friendly.)

In some cases, the repetition during a month of a combination of a specific number of different target IP addresses, specific different target ports and specific number of different intrusion signatures (matched against a list in the sensors 16, 17 and 19 of suspected intrusions) for a specific source IP address during a day is indicative of a malicious intrusion (decision 114, yes branch). This is based on records stored by server 32, based on past iterations of program 32 during previous analysis (for example, monthly) periods and patterns detected during such periods. In such cases where the combination is known to indicate an intrusion, program 32 displays for the analyst, or sends a notification to an administrator of the firewalls 19, 20 and 21, a description of the type of message or message traffic pattern determined to be malicious (step 125). Then, the administrator can take steps to correct the situation (step 126). Such steps can be to update the configuration of firewall 19, 20 and 21 to block the type of message that was detected. For example, the administrator can update the firewall to block the source IP address of the malware or the signature of the malware. As another example, the administrator can update the firewall 19, 20 and 21 to block traffic destined for a particular TCP port that is known to house malicious programs.

Refer again to decision 114, no branch, where the combination of a specific number of different target IP addresses, specific different target ports and specific number of different intrusion signatures matched for a specific source IP address during a certain number of days of the month does not equal a combination previously determined to be indicative of a malicious intrusion. In such a case, program 32 or the analyst determines if there is another reason to conclude that the messages from the source IP address are likely to be malicious or "malware" (decision 118). Program 32 (or the human analyst) makes the determination by looking for a predetermined or higher number of days (at least two and typically several days) during which there were the same number of different target IP addresses, same number of different target ports and same number of different intrusion signatures (matched by the sensor), where the source IP address is not known to be friendly. (The program 32 or human analyst may learn that an IP address is friendly by contacting the customer, and asking the customer if the customer knows the source IP address to be friendly.) In general, the higher number of days during which there were the same number of different target IP addresses, same number of different target ports and same number of different intrusion signatures matched, the greater the likelihood that the messages are intrusion, assuming the source IP address is not known to the analyst or customer to be friendly. If the number of such days exceeds the predetermined number (and the source IP address is not known to the analyst or customer to be friendly), then the program 32 or analyst warns the firewall administrators that this source IP address and signature are likely to be malicious (step 119).

Referring again to decision 118, no branch, where the combination of number of different target IP addresses, number of different target ports and number of different intrusion signatures matched do not indicate that the message is malicious, based on previous iterations of program 32 or other known patterns. In such a case, the reason may be that there are one or two days of data that are not characteristic of the messages. So, the analyst will review the numbers for each source IP address for each day, to determine which combination of specific number of different target IP addresses, specific number of different target ports and specific number of different intrusion signatures matched for a specific source IP address best represents the pattern of messages from the source IP address (step 120). For example, if there were eight days with the same number of target IP address, same number of target port and same number of different matched signatures, and one day with a different number of target IP addresses, different number of target ports or different number of matched signatures, the analyst will disregard this one day. After step 120, the analyst makes an entry in the database (the data warehouse) table 40 for this source IP address to reflect the representative numbers of different target IP addresses, different target ports and different signatures matched (step 122). Then, program 32 or the analyst repeats the analysis of decision 118 using the representative numbers. If the representative numbers indicate a malicious intrusion (step 118, yes branch), then program 32 performs the processing of step 119. If the representative numbers do not indicate a malicious intrusion, then program 32 deems the messages as not malicious and ignores them (step 124).

Refer again to step 104 and the other series of steps performed in parallel with steps 108-124. In step 130, intrusion analysis program 32 creates a destination port "pivot" table 42 to represent the distribution of numbers of destination ports per source IP address during the month. The port pivot table is based on a standard deviation from the norm calculated over a predetermined number of days, such as thirty.

Figure 3:
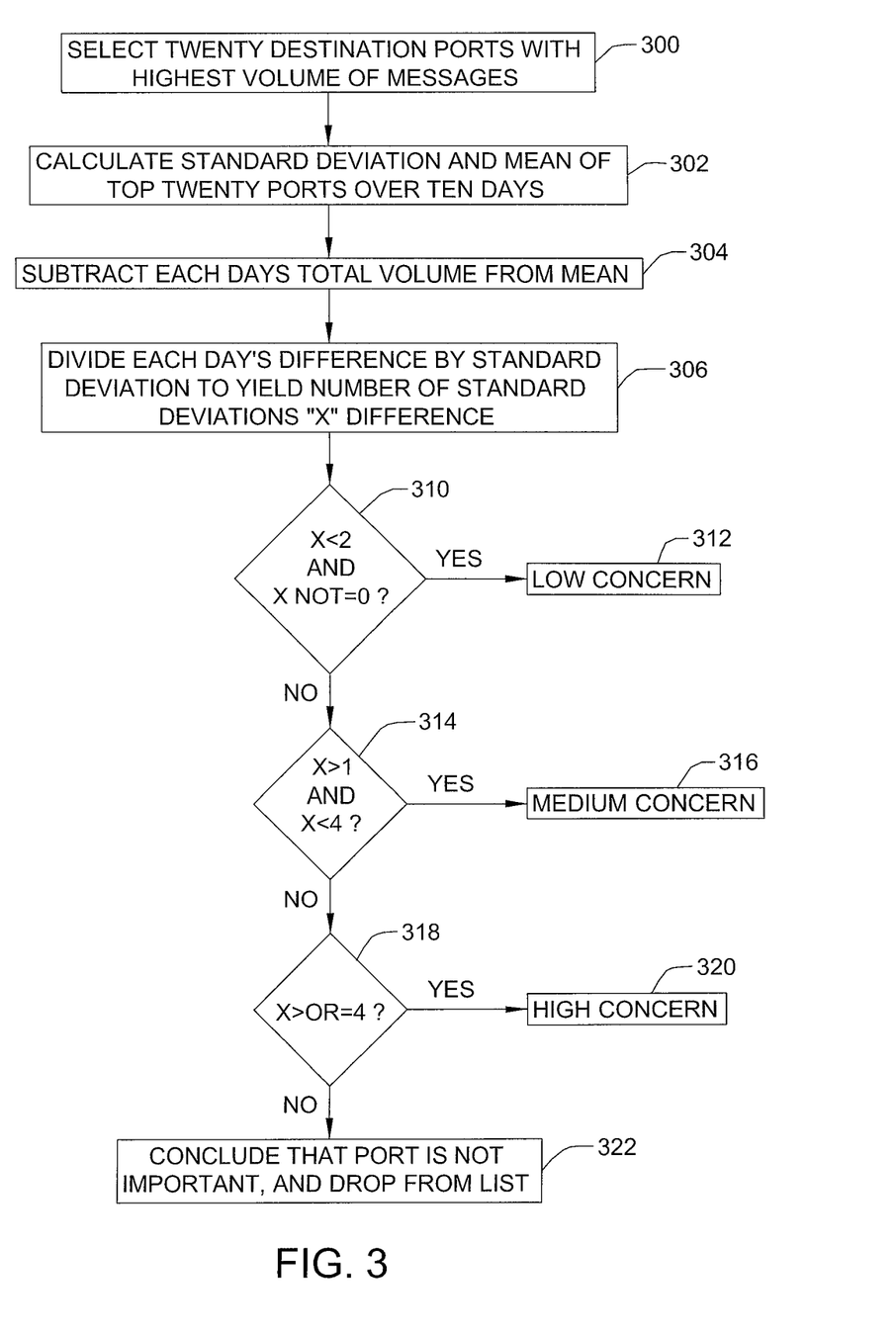
FIG. 3 is a flow chart of a statistical analysis function within the intrusion identification program of FIG. 2.

FIG. 3 illustrates step 130 in more detail. In step 300, program 32 identifies from the HTML table 40 a predetermined number (such as twenty) of destination ports that have the highest volume of incoming message traffic. Then, for each such destination port, program 32 calculates the standard deviation and mean of number of incoming messages for the last predetermined period (such as thirty days) (step 302). Then, program 32 subtracts each day's total number of incoming messages from the mean for the last predetermined period (such as thirty days) (step 304). Then, program 32 divides each day's difference calculated in step 304 by the standard deviation calculated in step 302 to yield the number of standard deviations ("X") above or below the norm for the day (step 306). The greater number of standard deviations above the norm, the greater the risk that the port is under attack. Thus, program 32 determines if "X" is less than two but not equal to zero (decision 310). If so, then program 32 categorizes or classifies the port as "low concern", i.e. unlikely to be the target of malware (step 312). Next, program 32 determines if "X" is greater than one but less than four (decision 314). If so, then program 32 categorizes or classifies the port as "medium concern", i.e. moderately likely to be the target of malware (step 316). Next, program 32 determines if "X" is greater than or equal to four (decision 318). If so, then program 32 categorizes or classifies the port as "high concern", i.e. likely to be the target of malware (step 320). If "X" is less than or equal to zero, then program 32 categorizes or classifies the port as not important, and drops it from the list (step 322)

Then, program 32 makes a record in HTML table 40 for the ports in the list (step 324). The record indicates the port number, number of incoming messages during the day, standard deviation from the mean, total number of incoming messages during the ten days and the level of concern. A human analyst periodically reviews the records made in step 324 to determine if further investigation is required (step 326). This determination is based on how many standard deviations from the mean a particular port deviates.

Referring again to FIG. 2, after program 32 creates the destination port pivot table in step 130, program 32 determines if there are any destination ports with highly anomalous data, i.e. data volumes that falls out of the normal range of activity for that port (decision 132). If there are no destination ports with highly anomalous data (decision 132, no branch), then program 32 concludes its analysis of the ports; no intrusions are suspected (step 134). However, if there are any destination ports with highly anomalous data (decision 132, yes branch), then program 33 or the human analyst performs an in depth analysis of such destination ports (step 136). The in-depth analysis comprises displaying information about the port, such as common programs that run on that given port and port volume data for a selected period of time (e.g., thirty days, sixty days or ninety days).

Program 32 can be loaded into server 12 from a computer storage medium such as magnetic tape or disk, optical CD ROM, DVD, etc. or downloaded from network media from the Internet via a TCP/IP adapter card, and stored in RAM in server 12. The storage media, network media and RAM are collectively called "computer readable media".

Based on the foregoing, a system, method and program for identifying malicious intrusions have been disclosed. However, numerous modifications and substitutions can be made without deviating from the scope of the present invention. Therefore, the present invention has been disclosed by way of illustration of not limitation, and reference should be made to the following claims to determine the scope of the present invention. The term "computer-readable storage device" does not encompass a signal propagation media such as a copper cable, optical fiber or wireless transmission media.

The invention claimed is:

1. A method for identifying a pattern of messages which is characteristic of a malicious intrusion, the method comprising the steps of:

a server receiving information identifying a destination IP address, a destination port and a signature of each of a multiplicity of messages having an indicia of a malicious intrusion, and in response, determining a total number of different destination IP addresses, a total number of different destination ports and a total number of different signatures of messages of the multiplicity of messages sent from each of a plurality of source IP addresses during each of a plurality of intervals of substantially the same duration;

the server determining that there are (a) a first total number of different destination IP addresses, a second total number of different destination ports, and a third total number of different signatures for the messages sent from one of the source IP addresses during one of the intervals and (b) the first total number of different destination IP addresses, the second total number of different destination ports, and the third total number of different signatures for the messages sent from the one source IP addresses during another of the intervals, and in response in part to repetition of (A) the number of different destination IP addresses for the messages sent from the one source IP addresses during the one and other intervals, (B) the number of different destination ports for the messages sent from the one source IP addresses during the one and other intervals, and (C) the number of different signatures for the messages sent from the one source IP addresses during the one and other intervals, the server determining that the one source IP address has sent a pattern of messages which is characteristic of a malicious intrusion, wherein the indicia of a malicious intrusion comprises a program function that unsuccessfully attempts to complete a TCP/IP three way handshake; and the server determining that the one source IP address is not known to be friendly; and wherein the step of the server determining that the one source IP address has sent a pattern of messages which is characteristic of a malicious intrusion is based in part on the step of the server determining that the one source IP address is not known to be friendly.

2. The method of claim 1 wherein the signatures are intrusion signatures of computer viruses or computer worms.

3. A computer program product for identifying a pattern of messages which is characteristic of a malicious intrusion, the computer program product comprising:

one or more computer-readable storage devices, and program instructions stored on the one or more storage devices, the program instructions comprising:

program instructions to receive information identifying a destination IP address, a destination port and a signature of each of a multiplicity of messages having an indicia of a malicious intrusion, and in response, determine a total number of different destination IP addresses, a total number of different destination ports and a total number of different signatures of messages of the multiplicity of messages sent from each of a plurality of source IP addresses during each of a plurality of intervals of substantially the same duration;

program instructions to determine that there are (a) a first total number of different destination IP addresses, a second total number of different destination ports and a third total number of different signatures for the messages sent from one of the source IP addresses during one of the intervals and (b) the first total number of different destination IP addresses, the second total number of different destination ports and the third total number of different signatures for the messages sent from the one source IP addresses during another of the intervals, and in response in part to repetition of (A) the number of different destination IP addresses for the messages sent from the one source IP addresses during the one and other intervals, (B) the number of different destination ports for the messages sent from the one source IP addresses during the one and other intervals, and (C) the number of different signatures for the messages sent from the one source IP addresses during the one and other intervals, determine that the one source IP address has sent a pattern of messages which is characteristic of a malicious intrusion, wherein the indicia of a malicious intrusion comprises a program function that unsuccessfully attempts to complete a TCP/IP three way handshake; and program instructions, stored on the one or more storage devices, to determine that the one source IP address is not known to be friendly; and wherein the program instructions to determine that the one source IP address has sent a pattern of messages which is characteristic of a malicious intrusion determines that the one source IP address has sent a pattern of messages which is characteristic of a malicious intrusion based in part on the determination that the one source IP address is not known to be friendly.

4. The computer program product of claim 3 wherein the signatures are intrusion signatures of computer viruses or computer worms.

5. A computer system for identifying a pattern of messages which is characteristic of a malicious intrusion, the computer system comprising:

one or more processors, one or more computer-readable memories, one or more computer-readable storage devices, and program instructions stored on at least one of the one or more storage devices for execution by at least one of the one or more processors via at least one of the one or more memories, the program instructions comprising:

program instructions to receive information identifying a destination IP address, a destination port and a signature of each of a multiplicity of messages having an indicia of a malicious intrusion, and in response, determine a total number of different destination IP addresses, a total number of different destination ports and a total number of different signatures of messages of the multiplicity of messages sent from each of a plurality of source IP addresses during each of a plurality of intervals of substantially the same duration;

program instructions to determine that there are (a) a first total number of different destination IP addresses, a second total number of different destination ports and a third total number of different signatures for the messages sent from one of the source IP addresses during one of the intervals and (b) the first total number of different destination IP addresses, the second total number of different destination ports and the third total number of different signatures for the messages sent from the one source IP addresses during another of the intervals, and in response in part to repetition of (A) the number of different destination IP addresses for the messages sent from the one source IP addresses during the one and other intervals, (B) the number of different destination ports for the messages sent from the one source IP addresses during the one and other intervals, and (C) the number of different signatures for the messages sent from the one source IP addresses during the one and other intervals, determine that the one source IP address has sent a pattern of messages which is characteristic of a malicious intrusion, wherein the indicia of a malicious intrusion comprises a program function that unsuccessfully attempts to complete a TCP/IP three way handshake; and program instructions, stored on the one or more storage devices for execution by at least one of the one or more processors via at least one of the one or more memories, to determine that the one source IP address is not known to be friendly; and wherein the program instructions to determine that the one source IP address has sent a pattern of messages which is characteristic of a malicious intrusion determines that the one source IP address has sent a pattern of messages which is characteristic of a malicious intrusion based in part on the determination that the one source IP address is not known to be friendly.

6. The computer system of claim 5 wherein the signatures are intrusion signatures of computer viruses or computer worms.

* * * * *